United States Patent
Zobel (10) Patent No.: US 10,620,118 B2
(45) Date of Patent: Apr. 14, 2020

(54) SYSTEMS AND METHODS FOR IDENTIFYING OPTICAL MATERIALS

(71) Applicant: STERIS INSTRUMENT MANAGEMENT SERVICES, INC., Birmingham, AL (US)

(72) Inventor: Jurgen Zobel, Pembroke Pines, FL (US)

(73) Assignee: STERIS Instrument Management Services, Inc., Birmingham, AL (US)

( * ) Notice: Subject to any disclaimer, the term of this patent is extended or adjusted under 35 U.S.C. 154(b) by 1011 days.

(21) Appl. No.: 14/381,550

(22) PCT Filed: Feb. 27, 2013

(86) PCT No.: PCT/US2013/028114
§ 371 (c)(1),
(2) Date: Aug. 27, 2014

(87) PCT Pub. No.: WO2013/130681
PCT Pub. Date: Sep. 6, 2013

(65) Prior Publication Data
US 2015/0032417 A1 Jan. 29, 2015

Related U.S. Application Data

(60) Provisional application No. 61/603,620, filed on Feb. 27, 2012.

(51) Int. Cl.
*G01N 21/41* (2006.01)
*G01M 11/02* (2006.01)

(52) U.S. Cl.
CPC ......... *G01N 21/41* (2013.01); *G01M 11/0228* (2013.01); *G01N 21/4133* (2013.01)

(58) Field of Classification Search
None
See application file for complete search history.

(56) References Cited

U.S. PATENT DOCUMENTS 4,411,525 A * 10/1983 Ogawa ............... G01N 21/65
356/318
4,987,488 A * 1/1991 Berci ..................... H04N 7/18
348/77

(Continued)

OTHER PUBLICATIONS

J. Räty, I. Niskanen, and K.-E. Peiponen, Fresnel reflectance in refractive index estimation of light scattering solid particles in immersion liquid, Appl. Phys. Lett. 96, 231112 (2010).*

(Continued)

*Primary Examiner* — Lina M Cordero
(74) *Attorney, Agent, or Firm* — C. Brandon Browning; Maynard, Cooper & Gale, PC (57) ABSTRACT

The present invention relates to methods for identifying optical materials, and more specifically to methods employed to identify glass and other optical materials used in medical devices. The method includes the steps of (1) selecting refractive index liquids matching a given optical sample; (2) determining the matching points for the refractive index liquids; and (3) calculating the refractive indices and selecting best fit optical materials. The invention also relates to a system for identifying optical materials. The system is under the control and operation of a computing device which documents, displays and stores all the data.

17 Claims, 5 Drawing Sheets

(56) References Cited

U.S. PATENT DOCUMENTS

| | | | | |
|---|---|---|---|---|
| 5,047,637 A * | 9/1991 | Toda | ............... | B82Y 35/00 250/443.1 |
| 5,151,752 A * | 9/1992 | Oono | ............... | G01M 11/0228 356/124 |
| 5,212,537 A * | 5/1993 | Birang | ............... | G01J 3/02 356/300 |
| 5,422,714 A * | 6/1995 | Fladd | ............... | G01N 21/45 356/128 |
| 6,078,681 A * | 6/2000 | Silver | ............... | G01N 21/6428 250/461.2 |
| 6,128,364 A * | 10/2000 | Niemann | ............... | G21K 1/06 378/43 |
| 2005/0062958 A1* | 3/2005 | Namiki | ............... | G01K 11/00 356/125 |
| 2005/0099682 A1* | 5/2005 | Lauer | ............... | G02B 21/0004 359/386 |
| 2005/0213080 A1* | 9/2005 | Huang | ............... | G01N 21/4133 356/128 |
| 2009/0078868 A1* | 3/2009 | de Jonge | ............... | H01J 37/26 250/310 |
| 2010/0081131 A1* | 4/2010 | Ach | ............... | C12Q 1/6841 435/6.12 |
| 2010/0103420 A1* | 4/2010 | Pahl | ............... | G01M 11/0228 356/365 |
| 2010/0141750 A1* | 6/2010 | Osawa | ............... | G02B 21/06 348/79 |
| 2011/0051127 A1* | 3/2011 | Kusaka | ............... | G01M 11/0228 356/128 |
| 2012/0307355 A1* | 12/2012 | Teixeira | ............... | G02B 21/26 359/395 |

OTHER PUBLICATIONS

Glass Refractive Index Determination: Scientific Working Group for Materials Analysis (SWGMAT), Forensic Science Communications (2004).*

Harvey C. Sunderman, Refractive index determination by orientation variation. 1. Uniaxial crystals, American Mineralogist, 55 (1970).*

Helen L. Gurewitz and Leroy W. Tilton, Measurement of the Refractive Index and Dispersion of Optical Glass for Control of Product, Part of Journal of Research of the National Bureau of Standards, vol. 32, Jan. 1944.*

Sebastien Wiederseiner, Nicolas Andreini, Gael Epely-Chauvin, and Christophe Ancey, Refractive-index and density matching in concentrated particle suspensions: a review, Exp Fluids (2011) 50:1183-1206.*

Ojena et al., (Precise Refractive Index Determination by the Immersion Method, Using Phase Contrast Microscopy and the Mettler Hot Stage, Jan. 1972, Journal of the Forensic Science Society, 12:1, pp. 315-329, https://doi.org/10.1016/S0015-7368(72)70682-9) (Year: 1972).*

Verkouteren, Jennifer R et al. "Accuracy of the Double Variation Technique of Refractive Index Measurement." Journal of research of the National Institute of Standards and Technology vol. 97, 6 (1992): 693-705. doi:10.6028/jres.097.033 (Year: 1992).*

* cited by examiner

SYSTEMS AND METHODS FOR IDENTIFYING OPTICAL MATERIALS

FIELD OF THE INVENTION

The present invention relates to systems and methods for identifying optical materials, and more specifically to systems and methods employed to identify glass and other optical materials used in unknown optical components.

BACKGROUND OF THE INVENTION

Optical materials include substances whose function is to alter or control electromagnetic radiation in the ultraviolet, visible, or infrared spectral regions. Optical materials are fabricated into optical elements such as lenses, mirrors, windows, prisms, polarizers, detectors, and modulators. These materials serve to refract, reflect, transmit, disperse, polarize, detect, and transform light, including light in the visible ultraviolet and infrared spectral regions. Atoms and their electronic configurations in optical materials interact with electromagnetic radiation to determine the material's macroscopic optical properties such as transmission and refraction. These optical properties are functions of the wavelength of the incident light, the temperature of the material, the applied pressure on the material, and in certain instances the external electric and magnetic fields applied to the material.

Most optical elements are fabricated from glass, crystalline materials, polymers, or plastic materials. In the choice of a material, the most important properties are often the degree of transparency and the refractive index. The uniformity of the material, the strength and hardness and temperature limits may also need to be considered. Optical materials are used in a wide variety of applications, including photolithography and medical devices such as endoscopes.

Medical instruments utilizing optical components are delicate and may easily break or become damaged by handling or by fluid contamination. Independent service companies in the field do not have access to replacement parts. It is necessary to reverse engineer these parts by determining all physical dimensions and materials. In many fields, such as with medical devices, optical components are not optimized as an individual component. Instead, the entire optical system is optimized as a complete unit. For this reason, the dimensions and materials of the replacement parts must exactly replicate the original parts. The performance of the optical system may be compromised if the replacement components are not identical to the manufacturer's components.

Optical materials are characterized by their refractive indices at well-defined wavelengths. Refractive Index (RI) is a function of the composition and thermal history of the material. The RI of a substance (i.e., an optical medium) is a number which describes how light, or any other radiation, propagates through that medium. The RI is mathematically expressed as $n_i = v_1/v_2$, where refractive index=$n_1$ at a specific wavelength i, and the speed of light in each media are $v_1$ and $v_2$. For glass analysis, $v_1$ is the speed of light in a vacuum or air.

Optical materials are also identified by the approximating the dispersion of the substance. Dispersion is the change in refractive index with a change in wavelength of illumination. All optical materials share the same typical dispersion curvature. As a result, optical materials are commonly characterized by the refractive indices of only three defined wave lengths. A first wavelength is selected from the yellow/green region of the visible spectrum. The two remaining wavelengths are selected from the blue and red region of the edge of the visible spectrum. Commonly referred to as V, relative dispersion is a measurement of the difference between the refractive index at different wavelengths of light, typically $n_C$ (486 nm), $n_D$ (589 nm), and $n_F$ (656 nm), mathematically expressed as $V=(n_D-1)/(n_F-n_C)$ (commonly referred to as the "Abbe number"). Several mathematical functions approximate the refractive index as a function of the wavelength, referred to as a dispersion formula. Exemplary dispersion formulas include the Schott formula, the Sellmeier formula, the Herzberger formula and the Hartmann formula. One of the most commonly used formulas utilized with high precision optical glass is the Sellmeier formula.

The Becke line method is a method for determining the refractive index of a transparent particle relative to its surrounding medium. A Becke line is the bright halo near the edge of a transparent particle immersed in a medium. The halo moves with respect to that edge as the focal plane of the microscope is changed. The RI may be measured by noting the direction that the Becke line moves when the distance between the objective of the microscope and the preparation is changed. The Becke line will always move toward the higher refractive index medium when the distance is increased and will move toward the lower refractive index medium when the distance is decreased from the point of critical focus. The Becke Line Method can't provide a quantitative determination of the differences between the two RIs. Additionally, two materials with nearly equal RI values will have bright boarders with a rainbow color, making a determination of the relative RI values impossible.

A second method of identifying optical materials utilizes a phase contrast microscope to differentiate between two materials where one is embedded in the other. Light will pass through the materials at different speeds if the materials have different refractive indices. Light passes through the materials at the same speed if they have the same RI. This is evidenced by the disappearance of the contrast between the two materials.

A method of comparing optical materials is termed the "Emmons Double Variation Method", which relies on the relationship between RI, temperature and the wavelength of light. A grain of an optical material is embedded in a liquid with a similar RI. The differing shapes of the diffusion curves of the two materials cause their RIs to match at only one wavelength, where the phase contrast will vanish. This wavelength is referred to as the matching point. The matching points in the Emmons method are determined at varying temperatures or by changing the wavelength of light. The RI of the immersed material can be determined by varying the temperature, causing a change in the RI curve of the immersion media. It is often difficult to efficiently transfer heat from the heating chamber to the sample, thus making this method laborious and time consuming.

What is needed in the art, therefore is a fast, reliable and documented procedure for identifying optical materials. Such a technique should distinguish optical materials with a precision necessary to reproduce compounds with such materials so that they may be used in medical instruments.

SUMMARY OF THE INVENTION

The present invention is directed to a method of identifying optical materials including selecting a range of optical liquids having matching points in the visual light spectrum for a given temperature; finding the exact spectral matching point for a clearly defined temperature for each of the optical liquids; calculating the refractive index for three of the matching points; and identifying optical materials in a publically available database comprising similar refractive indices.

According to one aspect there is provided a system for identifying optical materials, including a high powered light source; a monochrometer; a bright light condenser, a phase contrast condenser; a digital image recording device; and a phase contrast microscope comprising a temperature controlled table.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present invention is generally directed to systems and methods for identifying glass and other optical materials. In one embodiment, the method may be used by optical scientists to identify the types of lenses and prisms used in unknown compounds. The methods are fast and result in comprehensible and verifiable documentation of all steps. The documentation process records all data used to identify characteristic material parameters, which are the basis of the material identification.

Figure 1:
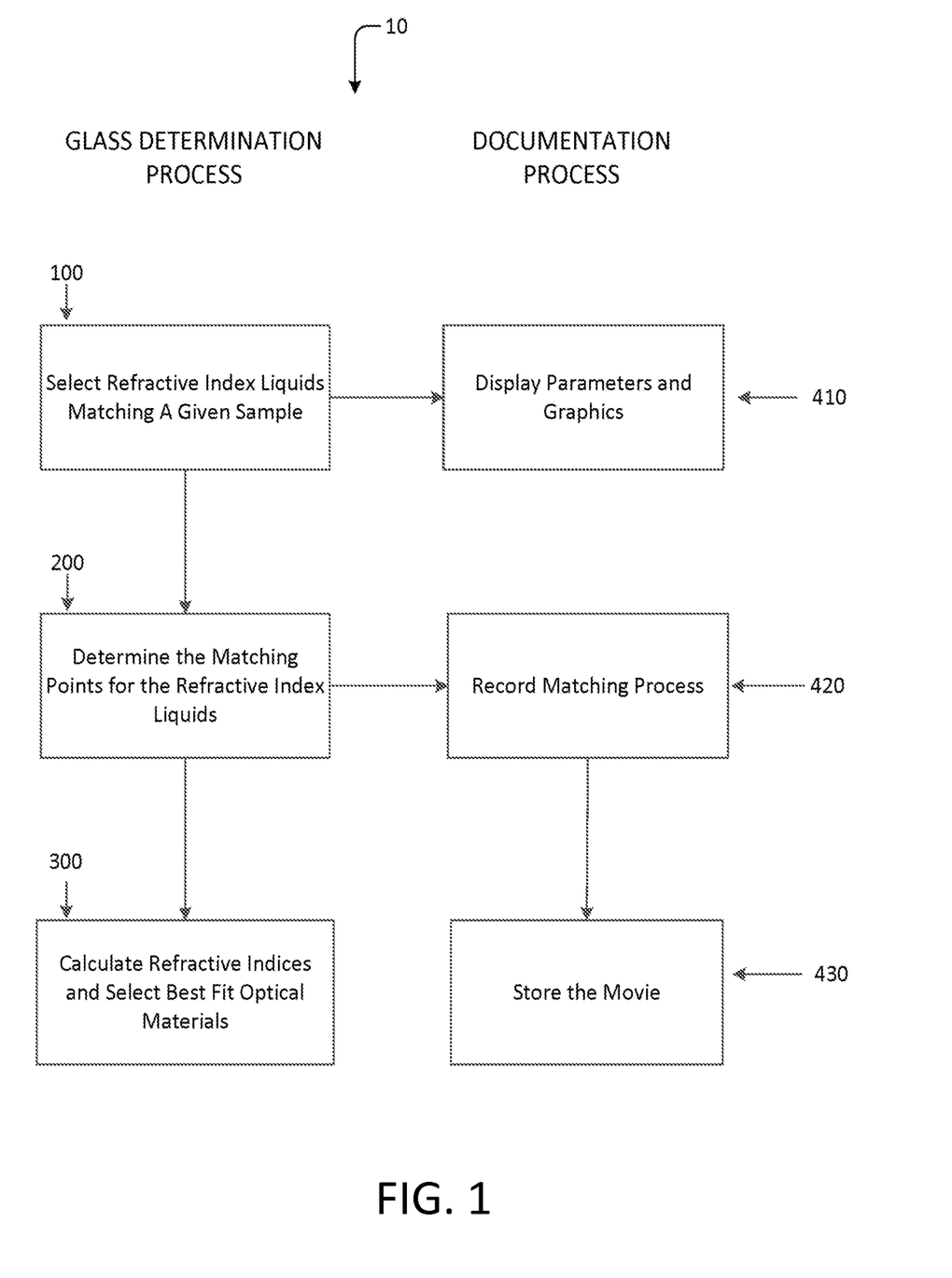
FIG. 1 is a flow diagram illustrating the optical material identification method of the invention.

FIG. 1 illustrates a flow chart of an exemplary method 10 for identifying optical materials. The first step 100 involves selecting a range of refractive index liquids (herein referred to as "RILs" or simply "liquids") matching the RI of a given optical material at one point in a given spectral range. As will be explained in greater detail below, the results of this first step 100 are documented 400 by recording and displaying each measurement parameter and graphic (410). Step two 200 requires determination of the exact spectral matching points for the selected liquids for given temperatures. The results of step two 200 are documented by recording a movie of the matching process 420. The movie is then stored 430 for later documentation. The final step 300 involves calculating the RIs at the matching point and selecting the best fit glass for a given glass catalog. Each of the steps 100, 200, 300 in the optical determination method 10 of the present invention will be discussed in greater detail below.

Figure 2:
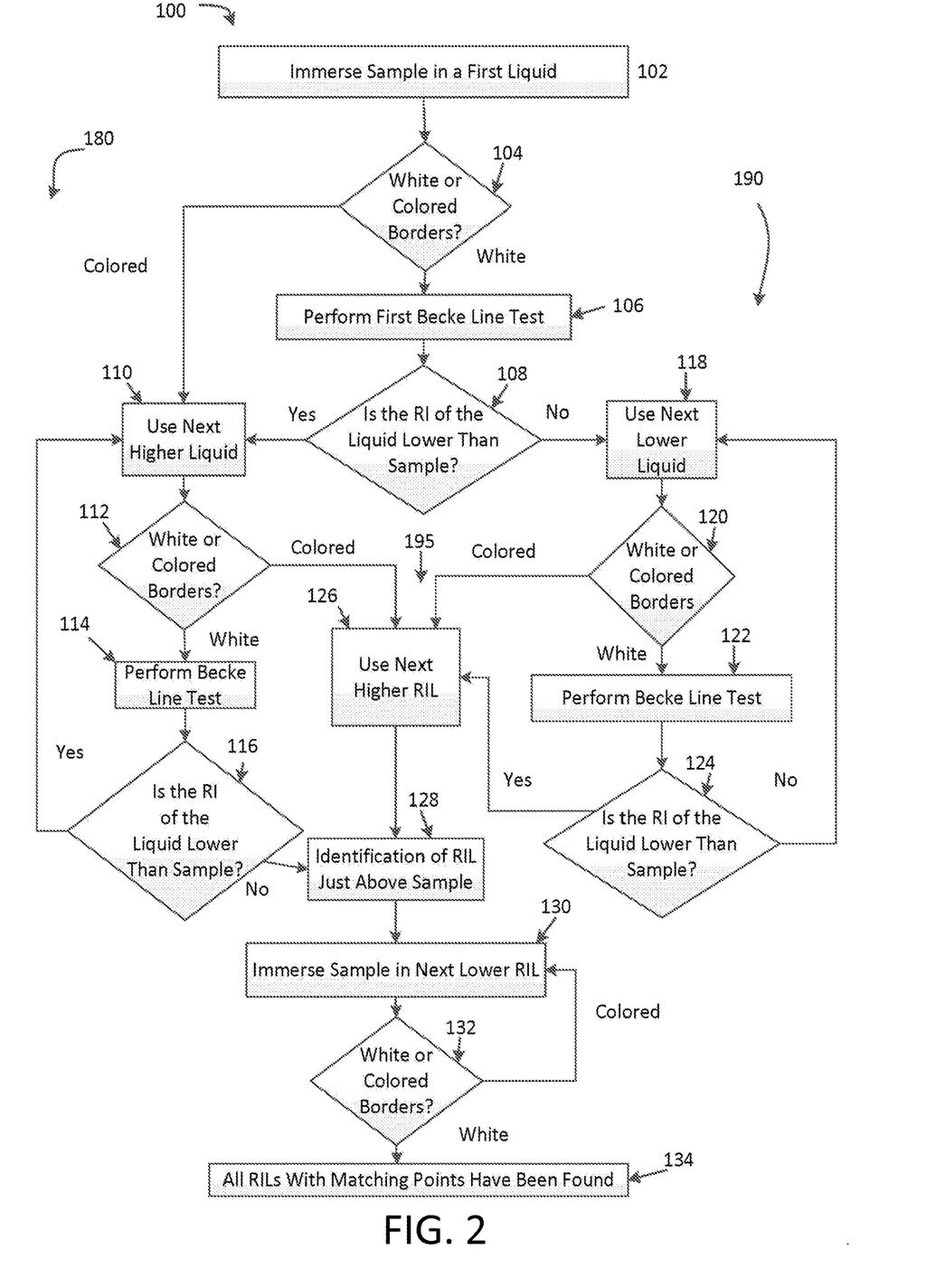
FIG. 2 is a flow diagram illustrating the first step of the optical material identification method of the invention.

FIG. 2 depicts the first step 100 in identifying the optical materials. This step 100 includes selection of a range of liquids which have matching RIs along the visual spectrum at a selected temperature range. Physical dimensions and functional parameters of intact optical materials (i.e., back focal length for typical wavelengths like $n_C$, $n_D$, and $n_F$) are often used as a starting point. Optical simulation programs may approximate the RI. For prisms, glass plates and lenses with a plan surface the refractive index can be estimated by comparing the optical lengths with the physical length of the component. If such measurements cannot be performed, experienced optical engineers estimate these parameters based on form and position in the optical system. These estimated starting points often speed up the process of the first step 100, however they are not necessary for the successfully completion of the identification method 10.

The optical material in question is shattered into small grains by procedures known to one of skill in the art. Several small samples of the resulting grains are placed on a microscope slide and immersed in a first liquid (block 102). The samples are separated so that each portion is embedded in a different liquid and each portion is covered with a small cover glass. The distance between the individual samples is large enough so the different liquids do not mix. The first liquid is selected in a way that all refractive indices of the liquid are slightly higher than the refractive indices of the projected solid sample.

Referring again to FIG. 2, if colored borders are observed (block 104), the sample is tested with a series of liquids with increasingly higher RIs, as illustrated on the left side of FIG. 2 (180). Here, the sample is immersed in a liquid with the next higher RI (110) and examined for the presence of white or colored borders (block 112). Samples showing white borders are analyzed by the Becke Line Test (114), and again immersed in a liquid with the next higher RI (block 110) until colored borders are observed (block 112). The samples are then immersed in a liquid with the next higher RI (block 126) and analyzed by the procedure illustrated in the center of FIG. 2 (195).

Referring again to block 104, samples showing white borders are analyzed by the Becke Line Test (block 106). IF the RI of the liquid is lower than the RI of the sample, (block 108), the sample is analyzed as described above (i.e, blocks 110-116). If the RI of the liquid is higher than the sample (block 108), the sample is tested with a series of liquids with decreasingly lower RIs, as illustrated on the right side of FIG. 2 (190). After immersion in a liquid with the next lower RI (block 118), samples with colored borders (120) are immersed in a liquid with the next higher RIL (block 126) and analyzed as illustrated in the center of FIG. 2 (195). Turning again to block 120, samples with white borders are analyzed by the Becke Line Test (block 122) and immersed in a liquid with the next lowest RI (blocks 124 and 118) until the RI of the liquid is lower than the RI of the sample.

Once all the sample show colored border (blocks 112 or 120) or when the RI of the liquid is lower than the sample (block 124), the sample is immersed in a liquid with the next higher RI (block 126). This identifies a liquid with a RI just above the sample (block 128). The sample is then immersed in a liquid with the next lower RI (130) and analyzed for white or colored bands (block 132) until the sample shows only white bands (block 132), At this point, all liquids with matching points have been found (block 134).

Figure 3:
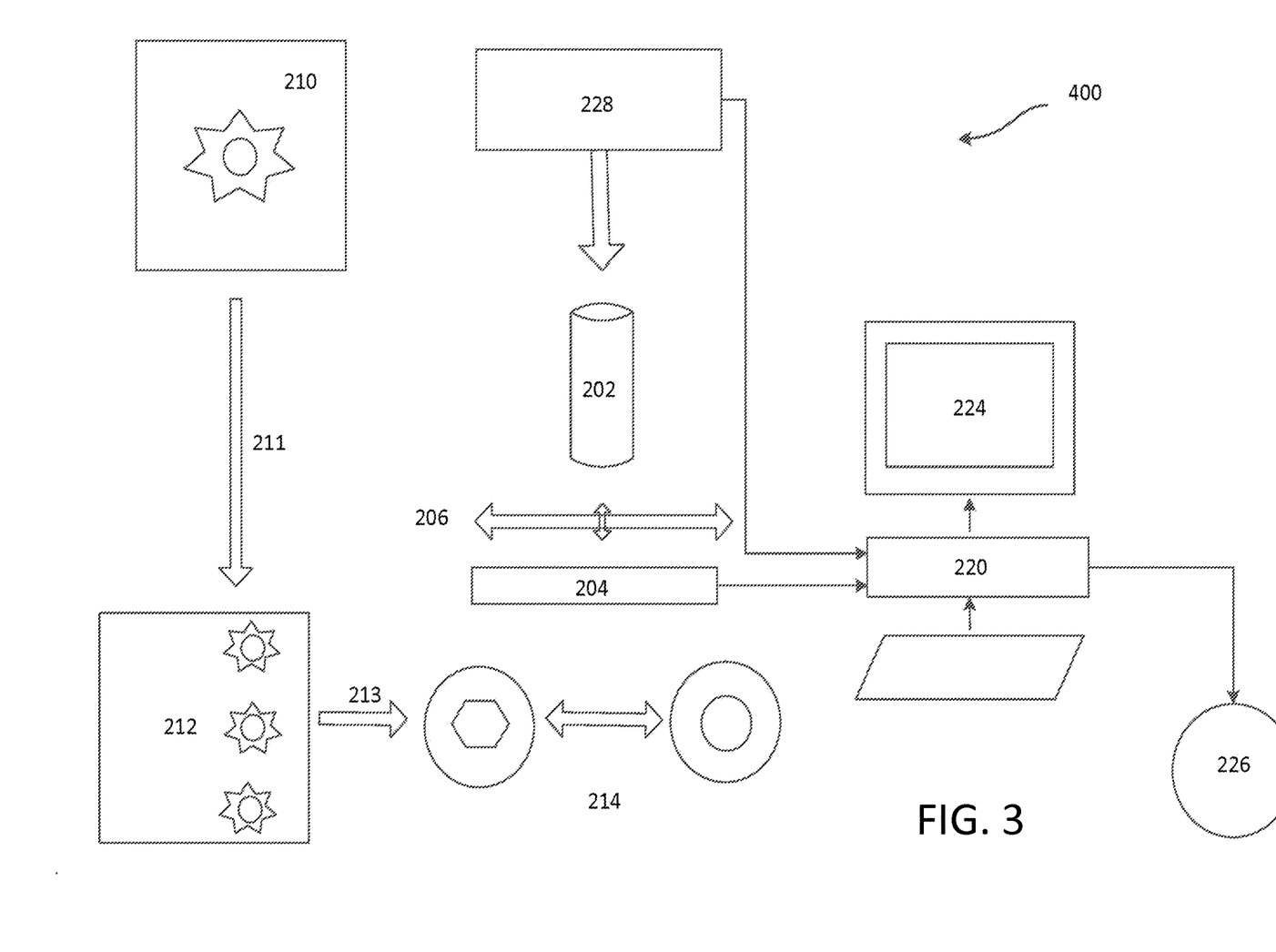
FIG. 3 is a diagram illustrating the second step of the optical material identification method of the invention.

An exemplary illustration of the second step 200 of the method of the invention will now be described with particular reference to FIG. 3. The second step 200 utilizes the Emmons Dual Variation Method to determine exact spectral matching points for the selected liquid or liquids specified in step one 100 and the sample at given temperatures. At the matching point, the RIL and the sample have the same RI only for a given wavelength and temperature. The contrast between the sample and the RIL vanishes at this wavelength/temperature pair. A matching point is identified by variation of the temperature and scanning the wavelength.

Continuing with step two 200, at least two additional liquids are selected for analysis by the Emmons Dual Variation Method. These additional liquids will possess RIs which are slightly and consecutively lower than the RI of the liquid identified in step one 100, for instance lower by 0.01 RIU. In one exemplary embodiment, a liquid with an RI of 1.89 at 25° C. was identified in step one 100 of the method. Three additional liquids with RIs of 1.88, 1.87 and 1.86 (at 25° C.) are analyzed according to step two 200 to determine the presence of any matching points with the sample. Any matching points are identified by observing the sample immersed in the individual liquid under a phase contrast microscope 202 including phase contrast objectives (not shown). Phase contrast microscope 202 converts phase shifts in light passing through a transparent specimen (such as optical materials) to brightness changes in the image. The phase shifts themselves are invisible, but become visible when shown as brightness variations. Microscope 202 further includes an adjustable thermal stage 204 which secures the microscope slide 206 containing the immersed samples. The thermal stage 204 allows for slow temperature adjustment to achieve even temperature variation throughout the sample, as will be discussed in more detail below.

Turning again to FIG. 3, the second step 200 of the method of the invention 10 further utilizes a light source 210 includes a high powered light output (not shown) appropriate for use in flexible light bundles. The phase contrast microscope 202 and the utilization of narrow bandwidths necessitates the use of a high power light source which provides illumination across the whole visible spectrum.

To overcome the restrictions of the previously described identification methods, the currently disclosed method 10 employs a monochromator 212 for fast scanning of the entire visual spectrum. Monochromator 212 includes changeable gratings and adjustable slits (not shown) placed at the light entrance and exit. Monochrometer 212 selects a small wavelength band from the light provided by light source 210. The monochromator 212 scans the whole visual spectrum in less than one minute without affecting the refractive index liquid.

The light from light source 210 is captured with a flexible illumination bundle 211 and fed to the entrance slit (not shown) of monochrometer 212. In one preferred embodiment, the circular cross section of the light output of the light source 210 is transferred in a square cross section meeting the form and dimensions of the entrance slit of light source 210. A second illumination cable 213 meets the square cross section in form and dimension of the exit slit (not shown) of monochrometer 212. The illumination cable 213 includes a circular cross section on the exit side and directly feeds the condenser system 214 of the phase contrast microscope 202. Phase contrast condenser 214 focuses the light on the sample contained in microscope slide 206. In addition, the condenser 214 may switch between bright light and phase contrast functions. Illumination bundles 211 and 213 may include a fluid light bundle having low absorption in the blue region of the spectrum. In an additional embodiment, glass fiber bundles are used. In this case, illumination cable 211 includes fused fibers to avoid burning and degradation of the fiber bundle end. The length of illumination cables 211 and 213 are minimized to reduce the absorption in the blue region of the spectrum.

Figure 4:
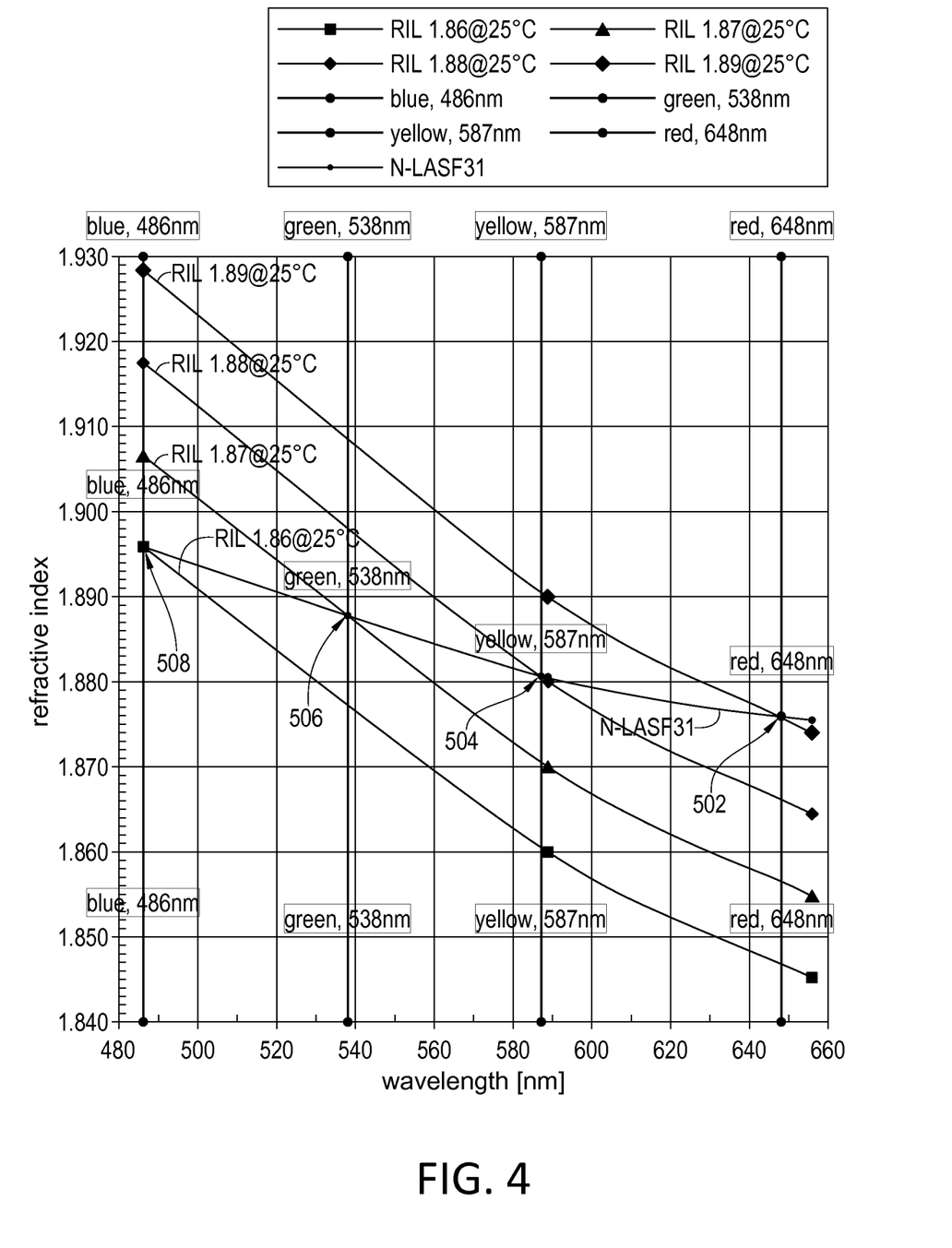
FIG. 4 is a graph of refractive index v. wavelength of four optical liquids where each exhibits a matching point.

FIG. 4 illustrates a graph of RIL v. wavelength for an optical sample immersed in four consecutive RILs. The four liquids may be, for example, those identified in step one (100) of the present invention. For each RIL/sample the visible spectrum is scanned using monochrometer 212. The dispersion curve of each liquid intersects the dispersion curve of the sample and results in a different matching point (RIL 1.89=648 nm (502), RIL 1.88=587 nm (504), RIL 1.87=538 nm (506) and RIL 1.86=486 nm (508)). The matching point is always at the same room temperature but the wavelength of the matching point is different for each different liquid. The monochrometer 212 quickly scans the entire visible spectrum, for instance in under one minute.

Figure 5:
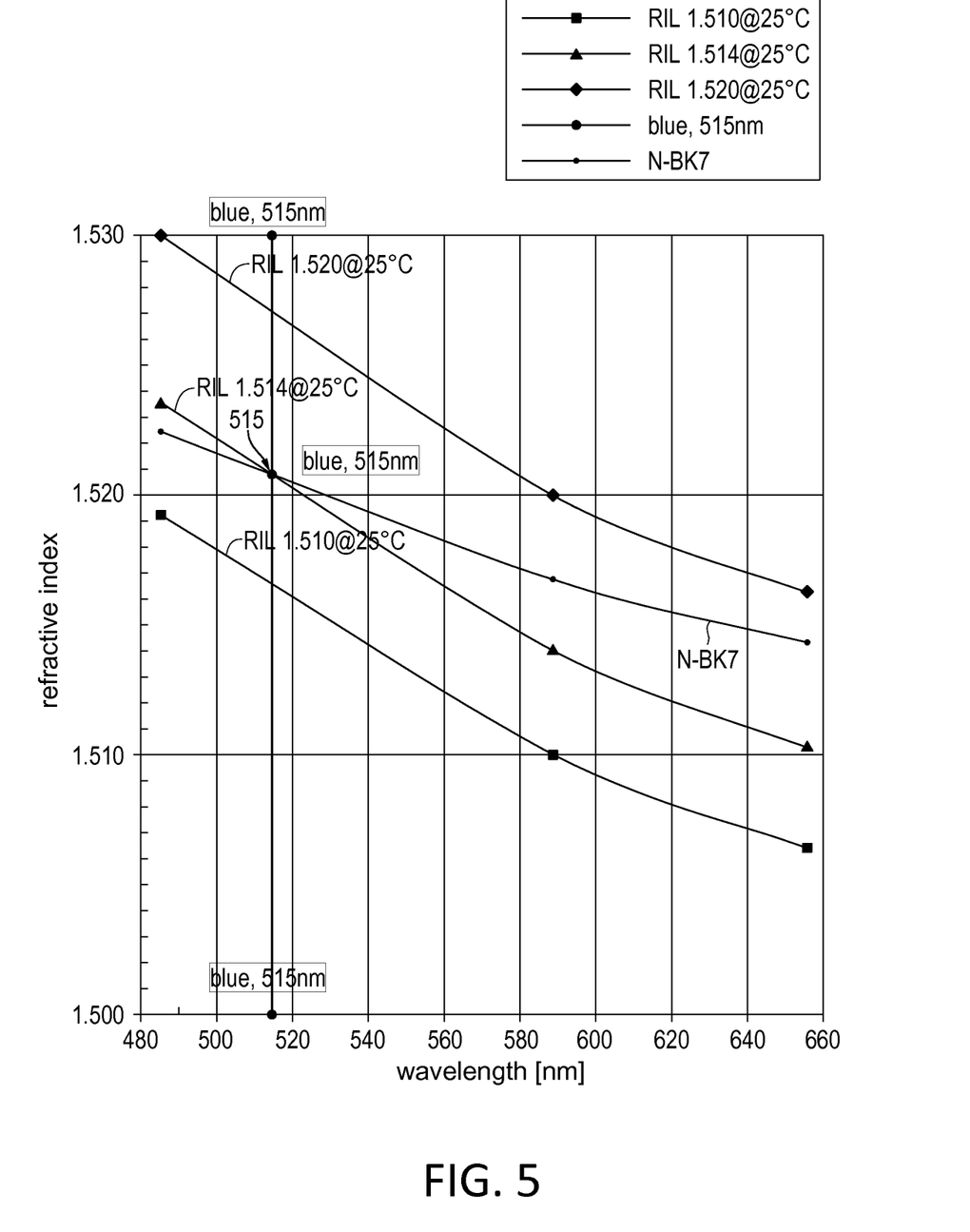
FIG. 5 is a graph of refractive index v. wavelength of three optical liquids where only one exhibits a matching point.

In a certain embodiment, the number of discrete refractive index liquids close to a given sample can be limited. Alternatively, the difference between the shape of the dispersion curves of the liquid and solid optical materials can be marginal. In such a case none or only one or two matching refractive index liquids can result from the first step. FIG. 5 illustrates a graph of RIL v. wavelength for an optical sample immersed in three consecutive RILs. In contrast to FIG. 4, each of the three different RILs do not show a matching point at room temperature. Only RIL 1.514 shows a matching point at 515 nm (510). In one embodiment, two additional matching points are created. In this embodiment, thermal variation is used to find at least three matching points for the same liquid at a different temperature and wavelength. Increasing temperature causes a shift in the wavelength of the matching point towards blue region of the visible spectrum. The thermal process is effective with one or two liquids. Referring again to FIG. 5, two additional matching points are created by shifting the temperature of liquid sample N-BK7 immersed in RIL=1.520 to 30° C. and then to 35° C. This results two matching points at 30° C. and 646 nm and another matching point at 35° C. and 568 nm.

Temperature scanning has several disadvantages. A matching point is detected with the phase contrast microscope. However, the thermal scan for a given wavelength is performed with a slow increase of 0.2° C./min. The scanning process therefore requires several hours to complete a scan of a range of 40° C. or 50° C. A spectral scan as used in the step two 300 of the method of the invention for a given temperature can be performed with a monochromator in a minute or less. In both methods the contrast of the sample when immersed in an optical liquid is observed through the phase contrast microscope. The matching point during the spectral scan and the matching point for the thermal scan are reached when the contrast of the grains vanishes. Each different liquid has also a different wavelength at room temperature as a matching point. It is preferable to find three or more of these refractive index liquids. This results also in three or more matching points at room temperature. For the following step, only three matching points are needed.

As mentioned above, completion of step one 100 can result in the identification of 0, 1, 2 or 3 liquids with matching points. In the case where less than three matching are identified, the presently described step two 200 of the method can identify additional matching points that may be used to identify the optical material, as illustrated in Table 1 below.

TABLE 1

Identification of additional matching points.

| Number of Liquids Found in Step One | Liquid Used For Identification of Additional Matching Points | Procedure |
|---|---|---|
| 0 | The liquid Identified with a RI just above the RI of the sample (block 128, FIG. 2). | Measure the identified liquid at three different temperatures (other than |

TABLE 1-continued

Identification of additional matching points.

| Number of Liquids Found in Step One | Liquid Used For Identification of Additional Matching Points | Procedure |
|---|---|---|
| 1 | The liquid identified in step 1 at room temperature. | (a) Identify the first matching point of the identified liquid at room temperature. (b) Measure the identified liquid at two different temperatures (other than room temperature) to create two additional matching points. |
| 2 | The two liquids identified in step 1 at room temperature. | (a) Identify the matching points of the two liquids identified in step 1 at room temperature. (b) Measure the identified liquids at a different temperature (other than room temperature) to create two additional matching points. |
| 3 | The three liquids identified in step 1 at room temperature. | (a) Identify the matching points of the three liquids identified in step 1 at room temperature. |

As detailed above, three matching points are required to search the publically available databases for the identification of an optical material. The presently disclosed methods and systems allow for the identification of one or more matching points in situations where dispersion curves of the sample and liquid do not intersect at room temperature (see FIG. 5). As exemplified by the presently disclosed invention and illustrated in Table 1, additional matching points are discovered by shifting the temperature of the immersed sample and measuring the dispersion curves of the sample and the liquid.

In a preferred embodiment, the present invention contemplates the identification of three or more of RILs with differing matching points at room temperature, as detailed above in step one (100) and step two (200). If more matching points are available, the three most distinctive matching points are utilized in the presently disclosed method. In one embodiment, the temperature shift for a given wavelength shift is estimated based on the RIL, allowing for quicker and more accurate temperature variation. In this embodiment, the temperature of the sample is quickly equilibrated. Next, the wavelength scanning by the monochrometer begins to rapidly determine the matching point for this established temperature level. With a minimum of three matching points for a given glass probe the third step of the disclosed process is performed. This step two 200 allows for the selection of refractive index liquids with the same refractive index as the sample at the three matching points characterized by the temperature and wavelength.

In one embodiment, the present invention contemplates the use of a computing device 220, such as a lap-top or desk-top computer, to manage and control the various components used in performing the method of the invention. Here, the computing device 220 includes a monitor 222, a printer (not shown) and screen recording software (not shown), the functions of which may be started, pause,
resumed and stopped on command. The bright light image, or alternatively the phase contrast image produced by the microscope 202 is recorded by a digital camera 228, and directed to and stored by computing device 220. The data generated by method 10 may be saved and stored by a conventional storage device 226 as is well known in the art. Computing device 220 may, in one embodiment, control a thermistor (not shown), allowing for precise adjustment of the thermal stage 204 and allow for the display of the temperature of the microscope slide 206 on the monitor 224. The computing device 220 may precisely raise and lower the thermal stage 204 and hold the temperature for an extended period of time.

In one embodiment of the third step of the present invention, three of the matching points for a given sample from step two 200 are selected for further analysis. Each matching point includes a temperature/wavelength pair for a given RIL. Two of these wavelengths are as close as possible to the blue and red border of the visual spectrum. The third wavelengths should be as close as possible to the middle of the two wavelengths.

The refractive indices at the three selected matching points from step two 200 are calculated with a mathematical calculation program stored and controlled by computing device 220, using the temperature gradient dn/dt and the coefficients of the dispersion formula of the refractive index liquids. The functional parameters of most optical materials are publically available. In one embodiment, these publically available databases are searched utilizing software stored on and operated through computing device 220. First, a fixed number of the samples are stored in a stack and sorted for the best match. Therefore, every consecutive sample is compared to the fixed number of stored samples. If a sample is a better match than any of the previously stored samples, that sample is stored and the least matching glass removed. This selective storage keeps this fixed number of best matching samples of a given optical material selection in the memory 226 of computing device 220. Computing device 220 then supplies a list of the best matching optical materials. The information for the optical materials on this final matching list contains the manufacturer name, the characteristic refractive indices and dispersion and the deviation relative to the sample. The user selects from the list an optical material based on the deviation between the identified and the sample and other engineering considerations as is known to one of skill in the art.

Referring again to FIG. 1, steps one (100) and two (200) of the present method are documented 400 using a screen recording program on the computing device 220. In one example, the screen recording program has a start, stop and pause position and functions in conjunction with other programs installed on computing device 220. The screen may display, in one example, a real time image of the digital camera showing the grains of the sample embedded in the RILs. The computing device 220 also may indicate the monochromator functions showing at least the actual center wavelength selected by the monochromator, the display of the actual temperature of the thermal stage 204, the microscope probe captured by the thermistor, and a small text window displaying the reference to the liquid positioned under the microscope objective. One of skill in the art will recognize that the software associated with the present invention may contemplate other functions and computing device 220 may display other type of information.

In one embodiment, information regarding each RIL determined in step one (100) is inputted and displayed in a text file (see block 400, FIG. 1). Then the screen recording software is started or resumed and the change of the Becke Lines (step one 100) is recorded for a short period of time. In this embodiment, the recording software is paused. This sequence of short movie clips shows which refractive index liquids have a matching point with the glass probe and which do not.

In an additional embodiment, the information regarding each RI obtained in step two 200 is inputted and displayed in a text file on computing device 220. The screen recording software (see block 420, FIG. 1) is started or resumed and the vanishing of the contrast of the probe is recorded together with the temperature of the probe for a short period of time. The recording software is paused and the clip stored in external storage device 226. This second sequence of short movie clips shows the pairs of temperature and wavelength defining the matching points and the reference to the refractive index liquid.

At the end of step three 300 the characteristic refractive indices, dispersions and deviation relative to the sample are printed to the screen 224. The screen recording software is resumed and the final results displayed on the screen are recorded at the end of all prior recordings. In one embodiment, the complete recording is edited and reduced to the essential necessary sequences. All steps, results and findings of the method are archived in one short movie clip.

The present invention further contemplates a system 400 for identifying optical materials. As illustrated in FIG. 3, the system includes a light source 210 utilizing a high powered light output (not shown) appropriate for use in flexible light bundles. The light is directed to a monochromator 212 for fast scanning of the entire visual spectrum. Monochromator 212 includes changeable gratings and adjustable slits (not shown) placed at the light entrance and exit. Monochrometer 212 selects a small wavelength band from the light provided by light source 210. The monochromator 212 scans the whole visual spectrum in less than one minute without affecting the refractive index liquid. Flexible illumination bundles 211 and 213 are placed at the entrance and exit areas (not shown) of monochrometer 212. Light emitting from monochrometer 212 is directed to a bright light/phase contrast condenser 214. The condenser 214 focuses the light on the sample contained in microscope slide 206. In addition, the condenser 214 may alternate between bright light and phase contrast functions. In an additional embodiment, a phase contrast microscope 202 with an adjustable thermal stage 204 secures the microscope slide 206 containing immersed optical samples. The thermal stage 204 allows for slow temperature adjustment to achieve even temperature variation throughout the sample. A digital camera 228 records images produced by microscope 202. The system further includes a computing device 220, such as a lap-top or desk-top computer, to manage and control the various components used in performing the method of the invention, and an external storage device 226 to store date.

Now, therefore, the following is claimed:

1. A method of identifying optical materials, the method comprising:
   determining a refractive index of an optical material sample at one point in a given spectral range;
   selecting a plurality of refractive index optical liquids, each with a refractive index matching the determined refractive index of the optical material sample at the point in the given spectral range;
   finding an exact spectral matching point for a defined temperature for each refractive index optical liquid of the plurality of refractive index optical liquids;
   calculating a refractive index for three of the exact spectral matching points; and
   identifying an optical material corresponding to the optical material sample using a publically available database, the identified optical material including similar refractive indices as the calculated refractive indices of the three exact spectral matching points.

2. The method of claim 1, wherein selecting the plurality of refractive index optical liquids, each with the refractive index matching the determined refractive index of the optical material sample at the point in the given spectral range includes: immersing the optical material sample in a first refractive index liquid (RIL); and performing a comparison of the refractive indices of the optical material sample and the first refractive index liquid.

3. The method of claim 2, wherein performing the comparison of the refractive indices of the optical material sample and the first refractive index liquid includes observing the optical material sample and the first refractive index liquid under a bright light microscope.

4. The method of claim 1, wherein the step of finding the exact spectral matching point for the defined temperature is performed by scanning a visual light spectrum.

5. The method of claim 4, further comprising:
   scanning the visual light spectrum at different temperatures.

6. The method of claim 4, wherein scanning the visual light spectrum is performed in less than one minute.

7. A system comprising:
   a high powered light source, wherein the high powered light source is a light source that provides illumination across a whole visible spectrum;
   a phase contrast microscope that includes a temperature controlled table;
   a condenser configured to perform (a) a light condensing function of focusing a light on a portion of an optical material sample contained on a microscope slide wherein the light condensing function, in collaboration with the phase contrast microscope, selects refractive index optical liquids each with a refractive index matching a refractive index of the optical material sample at one point in a given spectral range and (b) a phase contrast condensing function of finding, for each refractive index optical liquid of the selected refractive index optical liquids, an exact spectral matching point for a defined temperature;
   a monochromator configured to scan wavelengths at different temperatures for the selected refractive index optical liquids, to find three matching points of the exact spectral matching points; and
   a computing device configured to calculate a key parameter for the three matching points, wherein the key parameter is a material parameter of the optical material sample.

8. The system of claim 7, wherein the computing device includes software for control and operation of the temperature controlled table.

9. The system of claim 7, wherein the computing device includes software for searching a publically available database.

10. The system of claim 7, further comprising:
    a storage device.

11. The system of claim 7, wherein a first flexible light cable connects the high powered light source to an entrance slit of the monochromator, and wherein a second flexible light cable connects an exit slit of the monochromator to a condenser system of the phase contrast microscope.

12. The system of claim 11, wherein the first flexible light cable and the second flexible light cable have a circular cross section on one side which is transferred in a square cross section meeting a form and dimensions of the entrance slit and the exit slit of the monochromator.

13. The system of claim 12, wherein the first and second flexible light cables are fluid light cables.

14. The system of claim 11, wherein the first and second flexible light cables are fiber light cables.

15. The system of claim 7, wherein a temperature of the temperature controlled table is controlled by a thermistor.

16. A method of identifying a sample optical material, the method comprising:
   selecting refractive index optical liquids, each refractive index optical liquid with a refractive index matching a refractive index of the sample optical material at one point in a given spectral range, wherein the selecting uses a light/phase contrast condenser;
   determining, for each of the refractive index optical liquids, an exact spectral matching point for a given temperature, wherein the determining uses (a) the light/phase contrast condenser, (b) a high powered light source, and (c) a phase contrast microscope that includes a temperature controlled table;
   scanning, using a monochromator, wavelengths at different temperatures for the refractive index optical liquids, to find three spectral matching points of the exact spectral matching points;
   calculating a refractive index for the three spectral matching points found in the scanning; and
   selecting, from a list of optical materials in a glass catalog, optical materials that have a refractive index that is within a predetermined deviation from the calculated refractive index.

17. The method according to claim 16, wherein the selecting of refractive index optical liquids comprises:
   (a) choosing a range of refractive index optical liquids that have matching refractive indices along a visual spectrum at a given temperature range;
   (b) shattering the sample optical material into small grains;
   (c) immersing on a microscope slide, for each refractive index optical liquid of the range of refractive index optical liquids, a respective sample of the small grains;
   (d) selecting the refractive index optical liquids, based on an observation of a vanishing of contrast of the respective samples of the small grains immersed in the range of refractive index optical liquids.

* * * * *